United States Patent [19]

Michaelis et al.

[11] Patent Number: 5,167,740
[45] Date of Patent: Dec. 1, 1992

[54] METHOD OF MAKING A FILTER INSERT OF NONWOVEN MATERIAL IN THE FORM OF A PLEATED PACK

[75] Inventors: Udo Michaelis, Weiterstadt; Ulrich Schlör, Darmstadt, both of Fed. Rep. of Germany

[73] Assignee: Carl Freudenberg, Weinheim/Bergstr, Fed. Rep. of Germany

[21] Appl. No.: 638,955

[22] Filed: Jan. 9, 1991

[30] Foreign Application Priority Data

Jan. 25, 1990 [DE] Fed. Rep. of Germany ....... 4002078

[51] Int. Cl.$^5$ ............................................. B32B 31/20
[52] U.S. Cl. ..................................... 156/73.1; 55/500; 55/521; 156/202; 156/204; 156/227; 210/493.3; 210/493.5; 428/126; 428/181; 493/941
[58] Field of Search ................. 156/73.1, 200, 202, 156/204, 227; 428/181, 126; 493/941; 210/493.1, 493.3, 493.5; 55/497, 500, 521, 511

[56] References Cited

U.S. PATENT DOCUMENTS

| 1,830,096 | 11/1931 | Dollinger | 55/500 |
|---|---|---|---|
| 1,890,499 | 12/1932 | Davies | 55/521 X |
| 2,471,548 | 5/1949 | Schaaf | 55/521 X |
| 2,663,660 | 12/1953 | Layte | 156/204 X |
| 3,138,443 | 6/1964 | Engle et al. | 55/521 X |
| 3,401,803 | 9/1968 | Bub | 210/488 |
| 3,474,599 | 10/1969 | Schwab | 55/497 |
| 4,547,950 | 10/1985 | Thompson | 55/521 X |
| 5,057,251 | 10/1991 | Skold | 156/204 X |

FOREIGN PATENT DOCUMENTS

| 965012 | 5/1957 | Fed. Rep. of Germany | 55/521 |
|---|---|---|---|
| 2137309 | 2/1973 | Fed. Rep. of Germany | 55/521 |
| 2304882 | 8/1974 | Fed. Rep. of Germany | 55/521 |
| 61-103517 | 5/1986 | Japan | 210/493.1 |
| 1423529 | 2/1976 | United Kingdom | 55/497 |

*Primary Examiner*—Michael W. Ball
*Assistant Examiner*—Michele K. Yoder
*Attorney, Agent, or Firm*—Felfe & Lynch

[57] ABSTRACT

A filter insert of nonwoven material in the form of a pleated pack is self-supporting and consists of thermally weldable nonwoven (1). Each of the two outside ends (3) of the pleated pack (2) is hemmed by the nonwoven material (1) forming the pleats, which is folded over in the same direction and at the same time is fixed in tight contact to the corresponding folded of the adjacent pleat end. At the same time the nonwoven material projects beyond the near crease of the adjacent pleat end by 0.5 to 1.5 times the pleat spacing. For manufacture, the flat filter material (1) is first pleated and then a defined pleat spacing (7) is produced by drawing it apart to a limited extent. Then the two outside edges (8) of the pleated pack are gripped between comb-like tools (9) entering pincer-wise into the pleating at top and bottom, leaving the filter material projecting beyond the tools on each side by 1.5 to 2.5 times the pleat spacing (7). The projecting material (10) is folded over on both sides by means of a first pressers (11) acting thereon, until the projecting material (10) contacts the adjacent pleat end, so that the edges overlap one another. Energy permitting the thermal welding is delivered through these pressers (11). Additional pressers (12) that follow fix the welds during the cooling. Then the comb-like tools (9) are removed and the pleated pack is cut to length.

8 Claims, 3 Drawing Sheets

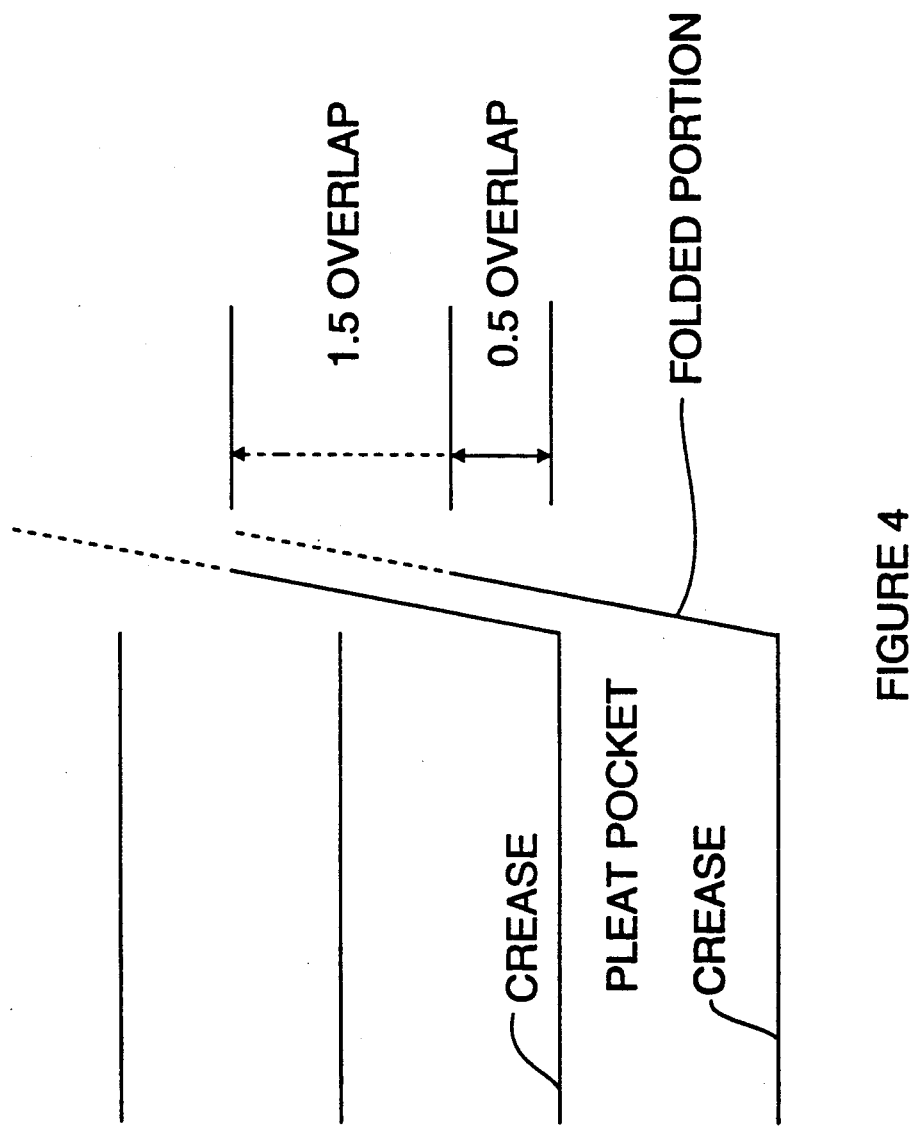

METHOD OF MAKING A FILTER INSERT OF NONWOVEN MATERIAL IN THE FORM OF A PLEATED PACK

BACKGROUND OF THE INVENTION

The invention relates to a filter insert of nonwoven material in the form of a pleated pack, and to a method for the manufacture thereof.

Such filter inserts, used especially as air filters for motor vehicles, usually consist of a filter material of paper or nonwoven material, for example, arranged in pleats.

In apparatus in which a measured air flow is required, as for example in automobile air conditioners, it is necessary to establish the number and width of the pleats according to their filtering characteristics, such that the pressure loss caused by the dust filter will be minimized.

In the manufacture, first the filter pack is shaped, and the hollow spaces formed by the pleating are cemented at the outer edges with a solid additional material. Then the distance between the individual pleats thus formed is adjusted, and then this pack is set in a frame.

By means of polyurethane soft foam systems, for example, the bottom edges of the pleated pack thus formed are bonded together, so that the spacing of the individual folds is fixed. This foam serves simultaneously as framing and as sealing means in order afterward to achieve a leakage-free sealing off of the filter inserted into a corresponding housing.

The filter inserts thus fabricated often do not have sufficient inherent stability, and require a correspondingly complex framing for their installation.

Another disadvantage consists in the recycling of the filter inserts. Additional materials, such as glues and frames, must also be disposed of.

In the known method of manufacture a plurality of working steps are necessary, such as cementing with additional materials, foaming, or also injection molding. It is also disadvantageous that the liquid sealing composition at the outer edges of the pleats expands and reacts in the mold, i.e., it also flows into the area behind the actual pleated pack and thus partially restricts the air inlet or outlet opening, so that the pack is not optimal as regards pressure loss.

Setting out from the above state of the art, it is the aim of the present invention to devise a filter insert which will not have the above-described disadvantages. At the same time the inherent stability of the insert is to be improved. Materials other than that of the filter material itself are to become largely unnecessary. The manufacturing process is to require fewer operations, and in particular it is to be possible to eliminate the liquid sealing composition at the outside edges.

SUMMARY OF THE INVENTION

According to the invention, the filter insert is self-supporting and the non-woven material is thermally weldable. The edges of the pleated pack are folded in the same direction so that folded portions of each pleat overlap the near crease defining the adjacent pleat by 0.5 to 1.5 times the pleat spacing, the folded portions of each pleat being thermally welded to the folded portions of the adjacent pleat.

The inset is manufactured by gripping a pleated sheet of non-woven material between a pair of comb-like gripping tools adjacent each edge of the sheet. The projecting ends are then folded against the gripping tools by a first pair of pressers which are heated to thermally weld the folded portions. A second pair of pressers then cools the welds, and the insert is released from the gripping tools.

The filter insert according to the invention is in the form of a pleated pack and is resistant to flexure in three coordinate directions. The self-supporting construction facilitates handling and assembly as well as the structural configuration of the holding means and the application of the gasket. The high moment of inertia of this design provides good compensation for surface loading caused by the increasing pressure on the filter material.

BRIEF DESCRIPTION OF THE DRAWINGS

FIG. 4 is a diagrammatic partial plan view illustrating the desired overlap of the folded portions.

DESCRIPTION OF PREFERRED EMBODIMENTS

The nonwoven material must be able to be welded to itself by the application of energy. This makes it possible to employ a method of assembly that will permit the pleat pockets to be made without using any additional medium such as cement.

Figure 1:
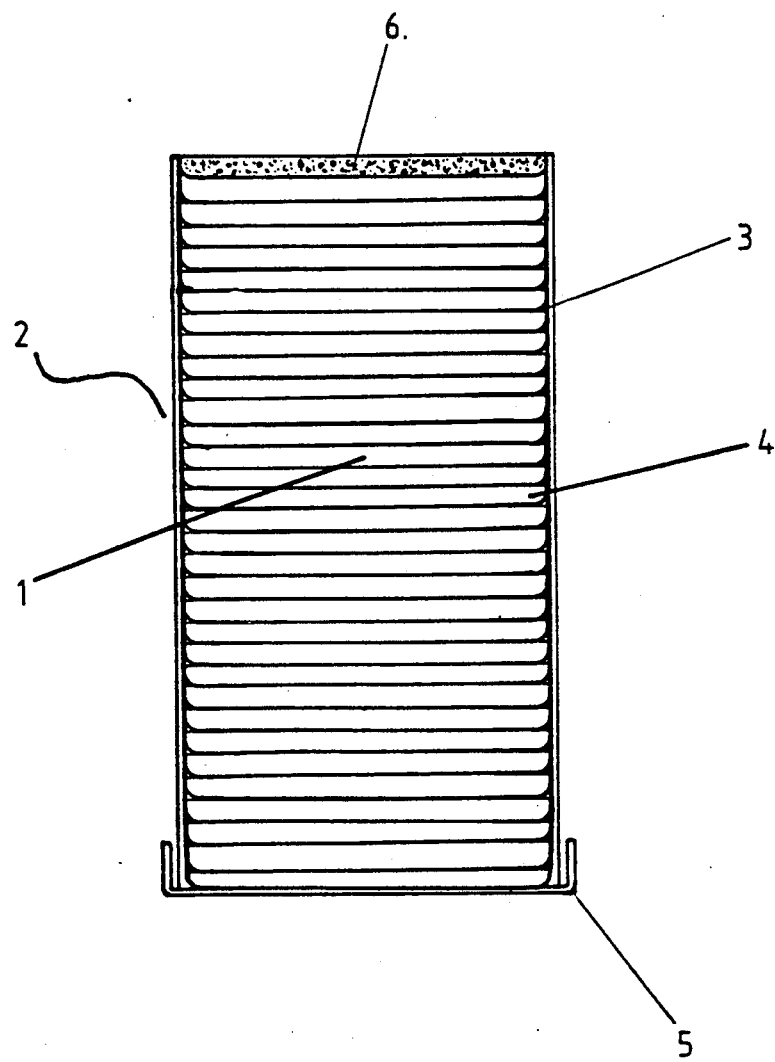
FIG. 1 is a plan view of a filter insert according to the invention.

Referring to FIG. 1, the two lateral surfaces perpendicular to the length of the pleats 4 are made from the same nonwoven material 1 which functions as a frame. Thus no additional material is needed to make such a frame.

Each pleat of the ready-made pleated pack 2 is folded over in the same direction at its outside end and set tightly and hence in a leak-free manner against the adjacent pleat ends 3. By folding and overlapping all adjacent pleats 4 in one direction a continuous lateral surface is produced. This surface seals the filter laterally an gives it a three-dimensional inherent stiffness.

Referring also to FIG. 4, the nonwoven material forming the pleats 4 overlaps the near crease of the adjacent pleat end by 0.5 to 1.5 times the distance 7 between the creases bounding the pleat pockets which form the pleats. With smaller overlaps there will be no assurance of a stiffening, stable framing with a simultaneously leak-free, overlapping sealing off of the individual filter pockets, i.e., there will be too little or no contact surface from the end of one pleat to the next pleat. Overlapping by more than 1.5 times the distance between creases has no decided effect on the stability of the frame. In that case more than three folds would have to be welded; high welding energy and longer cooling time would be the consequence, as well as additional consumption of material.

To be able to compensate the contact pressures in the horizontal direction against the end faces of the filter pack when the circumferential gasket is pressed to the holding frame, in a preferred embodiment of the filter insert its first fold and last fold are reinforced: both end faces of the pleated pack contain each a thermoplastic film 5 welded on as end caps, which for example are deep drawn parts and therefore can serve additional functions such as mounting guides or handles.

In an alternative and advantageous variant of the invention, at least one pleat pocket at each end of the pleated pack is filled with a hard plastic composition 6. This embodiment permits the creation of right-angle end faces which have the thickness of the pleated pack 2, and it is very stable dimensionally. On account of its simplicity it is preferred when there is no need for the filter insert to satisfy requirements beyond the task described in the beginning.

Figure 2:
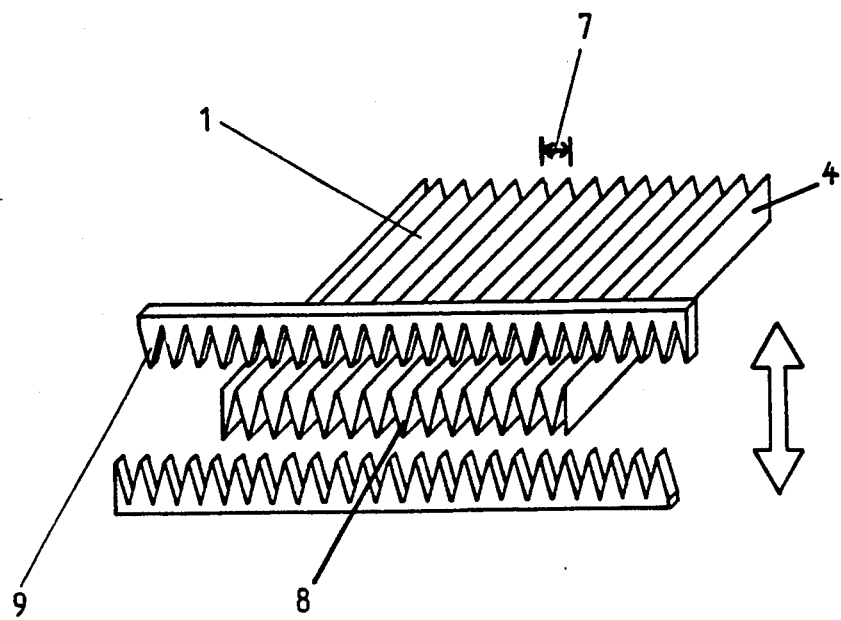
FIG. 2 is a perspective, diagrammatic representation of the components of the filter and auxiliary device for its manufacture prior to assembly.
Figure 3:
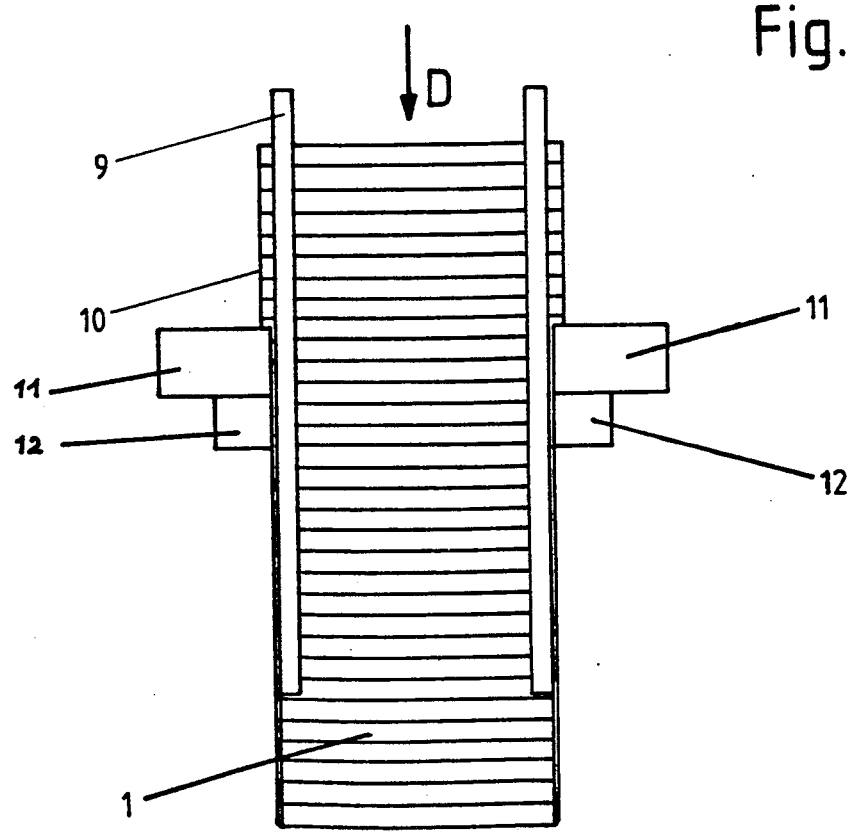
FIG. 3 is a diagrammatic plan view of how the filter edges are made.

The process for the manufacture of the pleated filter insert is indicated diagrammatically in FIGS. 2 and 3 and is based on the sequence which in itself is known in this technology, that first the outspread filter material is folded, then a defined pleat spacing 7, i.e., pleating comb spacing, is produced by drawing the pleats apart transversely of the folds to a limited degree, the pleated pack is fixed in its stable form and then cut to length. It is characterized by the selection of a thermoplastically weldable nonwoven fiber material as the material from which the pleated pack is to be made. After a defined pleat spacing 7 is produced, the two protruding end pleats 10 of the pleated nonwoven 1 are gripped top and bottom in comb-like gripping tools 9 shaped to conform to the geometry and dimensions of the pleats, while the parallel outer edges 8 of the pleats 4 are made to project on each side beyond the comb-like gripping tools 9 by 1.5 to 2.5 times the pleat spacing 7. Thus, each comb-like pleating tool 9 has the outer edges 10 of the pleats 4 projecting in the clamped state.

The comb-like gripping tools 9 are made so as to be displaceable in the directions marked by a double arrow (FIG. 2), and consist of bars provided with teeth in a comb-like arrangement, which intermesh and have parallel or slightly inclined flanks. This assures that the pleat edges will be held in a form-fitting manner. At the same time the tools 9 constitute an abutment or anvil for the contact pressure of the welding device 11.

The distance between the top and bottom gripping tools 9 from one another in the clamping state is best made equal to or slightly less than the thickness of the filter material, i.e., of the nonwoven fiber material.

Then, FIG. 3 represents the sequence of the process steps at D: the nonwoven material 10 projecting on both sides is folded over by means of a first presser 11 acting laterally thereon, until the projecting material lies against the adjacent pleat end, so that the edges 10 overlap, while at the same time the overlapping areas of the folded-over outside edges 10 are thermally welded by energy delivered through the pressers 11.

Additional pressers 12 then press the welded areas together until they cool, and set them. Lastly, the comb-like tools 9 are removed and the pleated strip is cut to length.

Each of the first two pressers 11 is carried linearly past the combs 9 with a spacing which is dependent upon the thickness of the filter material 1 and of the necessary welding pressure, while the projecting outer edges 10 are folded over laterally.

The advantage of this technique lies in the cutting tolerances of the pleated pack as regards the width and parallelism of the cut edges of the pleat ends, which thus becomes less exacting. In the production methods known to date, the pleated packs which are cemented leak-proof in premanufactured frames are cut with great precision.

The first presser 11 is so configured that the technique required for the introduction of the energy for the thermal welding will be integrated therein. Thus a very compact and economical construction is made possible. It is another advantage that a single arrangement of the first two pressers permits a pleat depth variation of the pleated pack 2 of as much as 100 millimeters.

The material, which is still not shape-stable in the manner described, is held by additional pressers 12 until it has cooled. Thus a gauging of the external contour, i.e., of the frame, is simultaneously produced. A plurality of these last pairs of pressers 12 can also be disposed in tandem.

The profile of the combs 9 which grip the pleats are then raised vertically out of the filter pockets and the filter pack 2 is cut to length in an additional process step.

The process described permits a continuous pleated pack production, and the length of the pleated pack can be varied at will.

The thermally weldable nonwoven material is to be defined very broadly for the present invention. Nonwovens can be used which consist partially or entirely of thermoplastic fibers, or all those which contain thermoplastic binders which can be welded.

In the claimed process, the framing of the filter pack is performed exclusively with the filter material 1 used, without the use of any additional materials. By folding over the outer edges 10 of the filter pack and the overlapping sealing of the individual spaces between the pleats, a leak-free, stiffening and stable self-framing of the pleated pack is achieved. This filter insert then often already has the necessary inherent stability.

Since additional framing is unnecessary, more free space is made available for the installation of the filter so as to minimize pressure loss.

The filter insert thus manufactured presents additional advantages in connection with recycling, for it consists essentially of only one material.

The process technology is straightforward and is an on-line method of production. Different pleated pack widths can be made with only one comb configuration, thereby reducing the cost of manufacture. This also is true of the application of the gasket, which is welded directly onto the outside surface of the filter pack in the process.

In a variant of the process, the first pair of pressers 11 is heated to a temperature above the melting range of the binding component of the nonwoven material 1. In this contact welding method the pressers 11 serve as welders. A method of this kind is to be preferred in the case of thick fiber nonwovens providing strong mechanical damping but having low adhesion in the melting range.

In an alternative process step, the folded-over and overlapping pleat ends 10 are bonded by means of pressers 11 which are in the form of ultrasonic sonotrodes.

Advantages of this variant are extremely fast welding and cooling, as well as the fact that it produces high temperatures only spot-wise in the nonwoven material. It can best be applied to nonwovens of low mechanical damping and having strong adhesion in the melting range.

Independently of the above-described process variants it is proposed as a final, additional process step that a thermoplastic film strip 5 be welded onto both butt ends of the pleated pack, either of the exact width of the pack or overlapping it. The purpose of these strips is to strengthen the butt ends in the horizontal direction so that they can accommodate the pressure of the seal when the filter cassette is assembled.

Before the piece is cut to length, a plastic composition 6 curing at room temperature is cast in at least one pocket of the filter at the line at which the piece is to be cut. To cut the pack 2 to length, this plastic is severed through the center. The resultant cut surface thus forms an angled outer side of the filter pack.

We claim:

1. Process for manufacturing a non-woven filter in the form of a pleated pack, comprising the following steps:

providing a sheet of thermoplastically weldable non-woven material, folding said sheet to form a pleated pack comprising a plurality of parallel pleats each comprising a pleat pocket bounded by a pair of parallel creases at a fixed pleat spacing, said pleated pack having opposed edges perpendicular to said pleats, providing two pairs of gripping tools, each pair comprising a top gripping tool and a bottom gripping tool, each tool having a plurality of teeth having said fixed spacing and designed to intermesh with the other tool of the pair, gripping said pleated pack between said tools adjacent to each edge of said pack so that said non-woven material projects beyond the gripping tools by 1.5 to 2.5 times the fixed pleat spacing, folding said projecting material over in the same direction adjacent to each edge to form folded portions of said pleats, said folded portions lying against said gripping tools and overlapping the near crease of the adjacent pleat by 0.5 to 1.5 times the pleat spacing, thermally welding the folded portion of each pleat against the folded portion of the adjacent pleat, and removing said top and bottom gripping tools.

2. Process as in claim 1 wherein said folding of said projecting material to form folded portions and said thermal welding of said folded portions is performed by a first pair of bilateral pressers which fold said projecting material against said gripping tools.

3. Process as in claim 2 wherein said non-woven material comprises a fiber and a thermally meltable bonding agent, said pressers being heated to a temperature above the melting point of said bonding agent in order to thermally weld said bonded portions.

4. Process as in claim 2 wherein said first bilateral pressers each comprise an ultrasonic sonotrode which spot welds said folded over portions of non-woven material to each other.

5. Process as in claim 1 comprising the additional step of cooling said folded portions by means of a second pair of bilateral pressers after thermal welding.

6. Process as in claim 1 wherein said pleated pack comprises a pair of opposed end faces which parallel the pleats, said process comprising the further step of affixing at least one thermoplastic film strip to a respective at least one of said end faces.

7. Process as in claim 1 wherein the pleated pack has opposed end faces which parallel said pleats, said pleats comprising a plurality of pleat pockets, said process comprising the further step of casting a plastic composition which cures at room temperature into a pleat pocket adjacent at least one of said end faces.

8. Process as in claim 7 comprising the further step of cutting said cast material lengthwise along the center of said pleat pocket.

* * * * *